US005220312A

United States Patent [19]

Lumelsky et al.

[11] Patent Number: 5,220,312

[45] Date of Patent: Jun. 15, 1993

[54] PIXEL PROTECTION MECHANISM FOR MIXED GRAPHICS/VIDEO DISPLAY ADAPTORS

[75] Inventors: Leon Lumelsky, Stamford, Conn.; Alan W. Peevers, Peekskill; Sung M. Choi, White Plains, both of N.Y.

[73] Assignee: International Business Machines Corporation, Armonk, N.Y.

[21] Appl. No.: 414,967

[22] Filed: Sep. 29, 1989

[51] Int. Cl.[5] .......... G09G 1/28; H04N 9/74

[52] U.S. Cl. .......... 340/721; 340/747; 340/799; 358/22

[58] Field of Search .......... 358/22, 183, 188, 150, 358/148; 340/721, 723, 734, 747, 799, 203, 725, 726

[56] References Cited

U.S. PATENT DOCUMENTS

| | | | |
|---|---|---|---|
| 4,303,986 | 12/1981 | Lans . | |
| 4,317,114 | 2/1982 | Walker . | |
| 4,651,146 | 3/1987 | Lucash et al. | 340/721 |
| 4,782,462 | 11/1988 | Kaplinsky et al. | 340/799 |
| 4,849,745 | 7/1989 | Satou | 340/721 |
| 4,907,086 | 3/1990 | Truong | 358/183 |
| 4,947,257 | 8/1990 | Fernandez et al. | 358/22 |
| 4,954,819 | 9/1990 | Watkins | 340/799 |
| 4,994,912 | 2/1991 | Lumelsky . | |
| 4,996,598 | 2/1991 | Hara | 358/22 |
| 5,001,469 | 3/1991 | Pappas et al. | 340/721 |
| 5,065,231 | 11/1991 | Greaves et al. | 340/734 |

OTHER PUBLICATIONS

Digital Video Signal Processing, Philips, pp. 1–40, 9–89.

*Primary Examiner*—Alvin E. Oberley
*Assistant Examiner*—Steve Saras
*Attorney, Agent, or Firm*—Roy R. Schlemmer, Jr.; Louis J. Percello

[57] ABSTRACT

A locking mechanism is incorporated in a high-resolution video display system including a monitor, a computer for providing controls signals to said display system and two frame buffers, one for storing computer generated graphics images and one for storing video data both of said buffers being operable under control of said computer for reading out data to the monitor. The locking mechanism includes an output lock functionally located between the output of both of the frame buffers and the monitor for preventing video data from overwriting graphics data on said monitor screen. An input lock is also provided for preventing static video data stored in predetermined regions of the video frame buffer from being continually overwritten by motion video data being continually supplied to the video frame buffer. The output lock utilizes an extra bit-plane in the video buffer which stores a predetermined lock pattern and utilizes the normal monitor output port of the buffer operating under control of standard frame buffer addressing circuitry in combination with straight-forward combinational logic to achieve the locking function. The input lock utilizes a small DRAM which stores the input lock pattern data and utilizes this data in conjunction with normal write operations in the video buffer to control circuitry to disable the write function in predetermined regions of the video buffer.

6 Claims, 9 Drawing Sheets

PIXEL PROTECTION MECHANISM FOR MIXED GRAPHICS/VIDEO DISPLAY ADAPTORS

FIELD OF THE INVENTION

The present invention relates to the field of computer display devices. More specifically it is directed to interactive display device architectures in which standard video data and high-resolution computer generated graphics data may each be displayed in different combinations on a high-resolution graphics monitor. The invention provides a mechanism for preventing unwanted data from overwriting predetermined windows on the display.

CROSS REFERENCE TO RELATED APPLICATIONS

U.S. patent number 4,994,912, filed Feb. 23, 1989 of Lumelsky et al., Entitled "Audio Video Interactive Display" discloses a video adapter architecture which allows the simultaneous viewing of video and graphics data via "windowing" split images or the like. Two frame buffers are provided, one for storing video data and one for storing graphics. By utilizing appropriate control architecture the outputs of both buffers are matched to each other and to a high-resolution monitor on which composite displays may be generated.

BACKGROUND OF THE INVENTION

There have been several systems in recent years such as IBM's Infowindow product that integrates graphics with live video on one monitor. For a detailed description of the infowindow product, reference should be made to one of the following publications describing same.

1) "Infowindow Guide to Operations" Order No.: SK2T0297 and,
2) "Infowindow Enhanced Graphics Adapter: Hardware Maintenance and Service Manual" Order No.: SK2T0298, Both are available from IBM Corp. Mechanisburg, Pa.

Typically, the graphics information is "overlayed" on top of the video; the background is a moving video image, with the foreground being comprised of various graphic objects, such as icons, menus, or text.

In order to display both elements on a single monitor, it is necessary to synchronize the video signal with the graphics signal, so that both rasters are the same size and are displayed at exactly the same rate. Furthermore, each video pixel should correspond one to one with a graphics pixel so that both types may be addressed in the same manner. One way to achieve these requirements is through the use of two separate frame buffers, one for graphics, and one for video, as described fully in U.S. patent application Ser. No. 4,314,623 of Lumelsky and Peevers, entitled "Audio Video Interactive Display", filed on Feb. 23, 1989, "Audio Video Interactive Display". The video information is read out of the dual-port VRAM based video buffer using the same synchronization and clock signals as are used for the graphics Frame Buffer.

The most common method for overlaying is known as "color keying", where the background color for the graphics information is defined as the "keying" color, with all pixels of that special color being replaced by live video in these positions on the monitor (refer to FIG. 1A). Pixels of all other colors are shown on the monitor unmodified. This same method can be used to show video "objects" in the foreground, on a graphics background. Here, the objects (which could be rectangular video "windows" or arbitrarily shaped objects) that are to be seen as video are drawn in the keying color, which is some color other than that of the graphics background (refer to FIG. 1B). Graphics objects can also be shown in the foreground, provided they are not drawn using the keying color.

FIG. 2 illustrates a typical circuit for implementing the color keying scheme. It is comprised of a register 200 to hold the digital value of the keying color, a digital comparator 202, and a fast (pixel speed) analog multiplexer 204. The n-bit key register is constantly compared with the n-bit digital representation of the graphics pixels that are about to be displayed. N is typically a number between 1 and 8 in todays graphics displays. When one of these incoming pixels has the same value as the key color, the output of the comparator is asserted. This causes the analog switch 204 to output the voltage of the video signal at that instant. For any other color of input pixel the comparator will output the voltage of the analog graphics signal. The circuit shown is adequate for monochrome systems, where there is only one color component. With color graphics systems, one analog switch is necessary for each color component (typically three—one for each of Red, Green and Blue).

Typically, these overlay schemes are employed by dedicated, video-based application programs that control external video sources such as videodisk players, VCR's, etc. The user would start the application, which would in turn initialize the key register with a specific color and subsequently draw the graphics screen with the appropriate areas drawn with the keying color.

Several problems are encountered when one considers windowing, i.e., non-full-screen systems. These systems may have more than one application shown on the screen at a given time, especially with today's windowing, multitasking operating systems (e.g., the IBM OS/2 with Presentation Manager).

A first problem is encountered when the screen is shared by both video-based and non-video applications. The non-video applications typically know nothing at all about color keying, much less what color the current key is. They draw their various objects on the screen assuming that any color may be drawn and will be seen on the screen unmodified. As the video applications attempt to utilize the color key, various colored graphic objects in the non-video application will suddenly be replaced by video. Clearly, this is an unacceptable situation.

This problem is further complicated when multiple video applications are run concurrently on one screen. Essentially, the multiple applications will contend for one resource: the color key register. When a given application is running, it may modify the key register for its own purposes. This may cause disturbing effects in other application windows, since they may have drawn graphic objects in the same color as the new keying color. When the key register is modified, these objects will suddenly appear as video objects on the screen, which is almost certain to be undesirable from the user's standpoint.

A second problem is encountered when it is desired to use static video images on a common screen along with motion video and graphics. An example of this is shown in FIG. 3, where a still video snapshot is placed in a graphics window which is presented on a motion video background. The same buffer is being viewed in both the still video window and the moving video background, i.e., video overlay is taking place in both of these regions of the screen. In general, this situation may result whenever the high-color content capabilities of the video buffer are desired to present quality static images along with graphics while motion video is occurring in the background.

The difficulty is that the still region must somehow be protected from being overwritten by the surrounding process of sampling the live video background. As the new video information is stored into successive locations of the video buffer, those locations that store the static image will be corrupted, unless the sampling process is somehow prevented in this region.

Accordingly there is a need for a system that will solve these problems which is effective, reasonable in cost and, most importantly, can achieve these results in mixed application systems as described above.

SUMMARY AND OBJECTS

It is a primary object of the present invention to provide a mechanism, which is both cost-effective and reliable, for preventing predetermined areas on a monitor screen from being overwritten by unwanted material.

It is a further object of the invention to provide an output lock mechanism which prevents a graphics window on the monitor screen from being overwritten by video data.

It is another object of the invention to provide such an output lock mechanism which utilizes "color key" controls and existing frame buffer architecture to achieve the output lock function.

It is another object of the invention to provide an input lock mechanism which is effective to prevent a static video window from being overwritten by motion video.

It is another object of the invention to provide such an input lock mechanism which uses much of the existing frame buffer hardware to achieve the locking function.

Other objects features and advantages of the invention will be apparent from the subsequent description of the invention, the drawings and the claims.

The objects of the present invention are accomplished in general by a locking mechanism which may be readily incorporated into a high-resolution video display system including a high-resolution monitor, a computer for providing controls signals to said display system and including a high-resolution frame buffer for storing computer generated graphics images and reading out said graphics images at a rate controlled by said control signals, and a video data system including a video frame buffer which reads out video data under control of said computer. An output locking mechanism is functionally located between the output of both said frame buffers and the high-resolution monitor and includes means for preventing video data from overwriting graphics data on said monitor screen with video data. An input locking mechanism includes means for preventing static video data stored in predetermined regions of the video frame buffer from being continually overwritten by motion TV data being continually input to said video frame buffer.

The output lock mechanism utilizes an extra bit-plane in the video buffer which stores a predetermined "lock" pattern and utilizes the serial output port of the buffer operating under control of standard frame buffer addressing circuitry in combination with straight-forward combinational logic to achieve the locking function.

The input lock mechanism utilizes a RAM which stores the input lock pattern data and utilizes said data in conjunction with normal write operations in the video buffer to control the column address strobe (CAS) circuitry to disable the write function in predetermined regions of the video buffer.

DESCRIPTION OF THE DISCLOSED EMBODIMENT

Figure 1A:
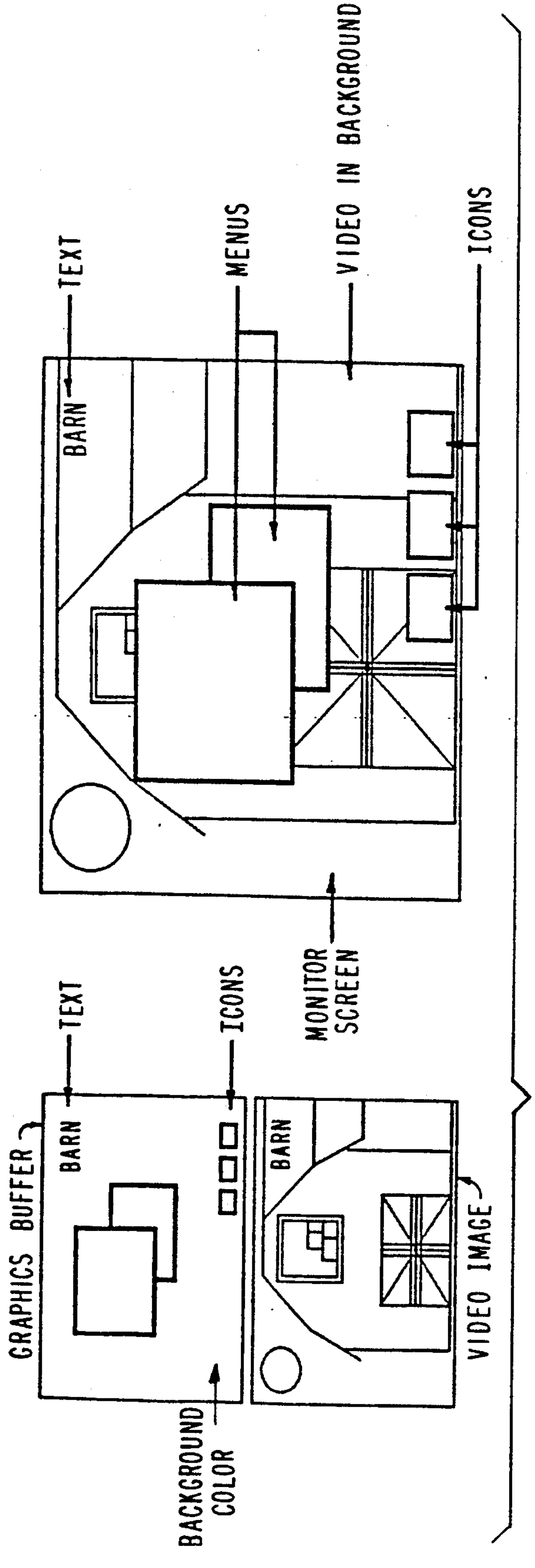
FIGS. 1A and 1B are diagrammatic representations of a display monitor illustrating various "windowing" operations possible on a monitor display which illustrate the various types of graphic and video data which may be combined to form a composite display which illustrates the problems addressed by the present invention.
Figure 1B:
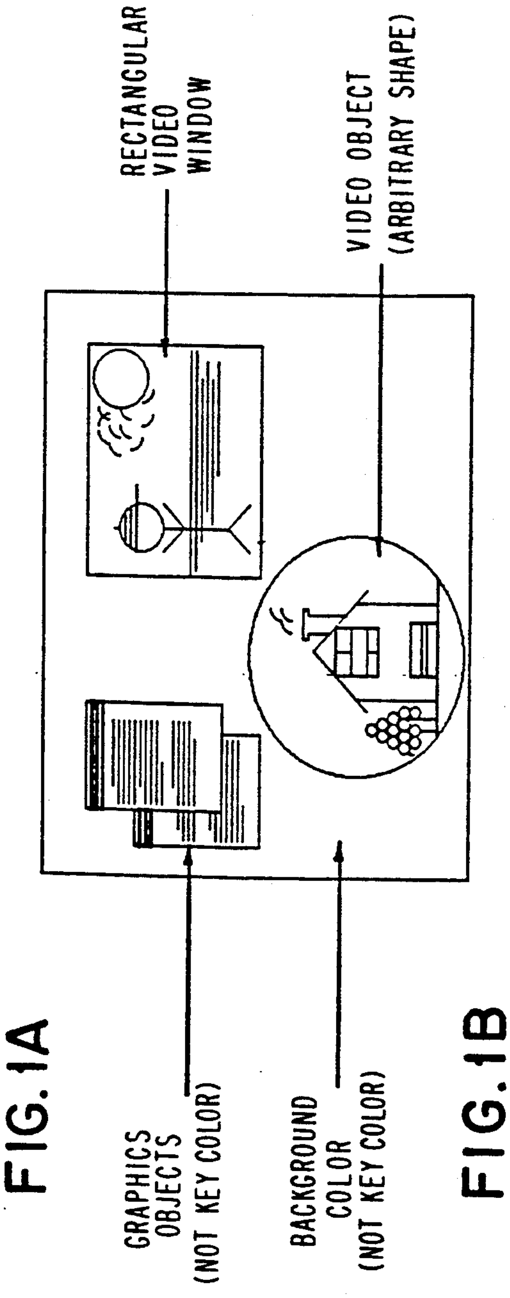

The present invention provides pixel protection mechanisms to address these problems. The first problem is solved using an "Output Lock" mechanism, whereby specific regions of the screen are prevented from being overlayed by video keying operations, regardless of the color of the graphics objects in those regions. This effectively solves the problem of running both video and non-video applications simultaneously on one screen. An extension to the Output Lock mechanism solves the problem of having multiple active video applications, by allowing each to have an independent keying color, without affecting the others. Also disclosed is an efficient means for loading the Output Lock protection mechanism.

The second problem is solved using an "Input Lock" mechanism, whereby specific regions of the frame buffer can be prevented from being updated by the process of sampling live video, thus allowing static video images to remain on a dynamic video background. An efficient means for loading the Input Lock mechanism, similar to that for loading the Output Lock mechanism, is also disclosed. In the sections that follow, the Output Lock and Input Lock mechanisms will be described and discussed separately.

Thus, to recapitulate, the input and output locks of the present invention broadly function to establish blocks to the presentation of incorrect data in certain designated windows on the display screen. The former prevents the overwriting of a static video window and the latter prevents overwriting a graphics window. They are functionally located at the input to and output from the video frame buffer. In the above context a window is usually understood to be smaller than the whole display screen, however, if the proper address parameters were given to the Input Lock and Output Lock mechanisms, they would be effective to control the whole screen as will be apparent from the subsequent description.

Output Lock

The protection scheme implemented involves the use of an additional Output Lock memory means to store information about which regions of the screen may utilize video overlay, with the other regions having video overlay defeated. This memory has the same height and width as the video buffer, and contains one or more bits of information corresponding to each pixel. The basic technique requires only one bit per pixel in the display memory. An extension to the technique involving the use of multiple-bit entries will be described below. The one bit scheme is used to determine on a pixel-by-pixel basis whether or not a given high-resolution pixel may have the video keying operations outlined above performed on it. If the bit is set, video keying operations are enabled for that pixel. If it is not set, that pixel will be displayed from the graphics frame buffer regardless of the color of the graphics pixel, i.e., the video overlay operation is defeated.

In a windowing environment supporting multiple applications, the window manager would initially clear this memory so as to disable keying (color key) operations altogether. When a subsequent application is started, the window manager would open a window on the high-resolution screen for that application to display its output. If the application doesn't employ or support video, nothing more needs to be done. However, if a video application is started, the window manager would open (draw) the application window in the graphics buffer and at the same time place ones in the corresponding region of the Output Lock memory, enabling video keying over window operation to take place in that window.

Figure 4:
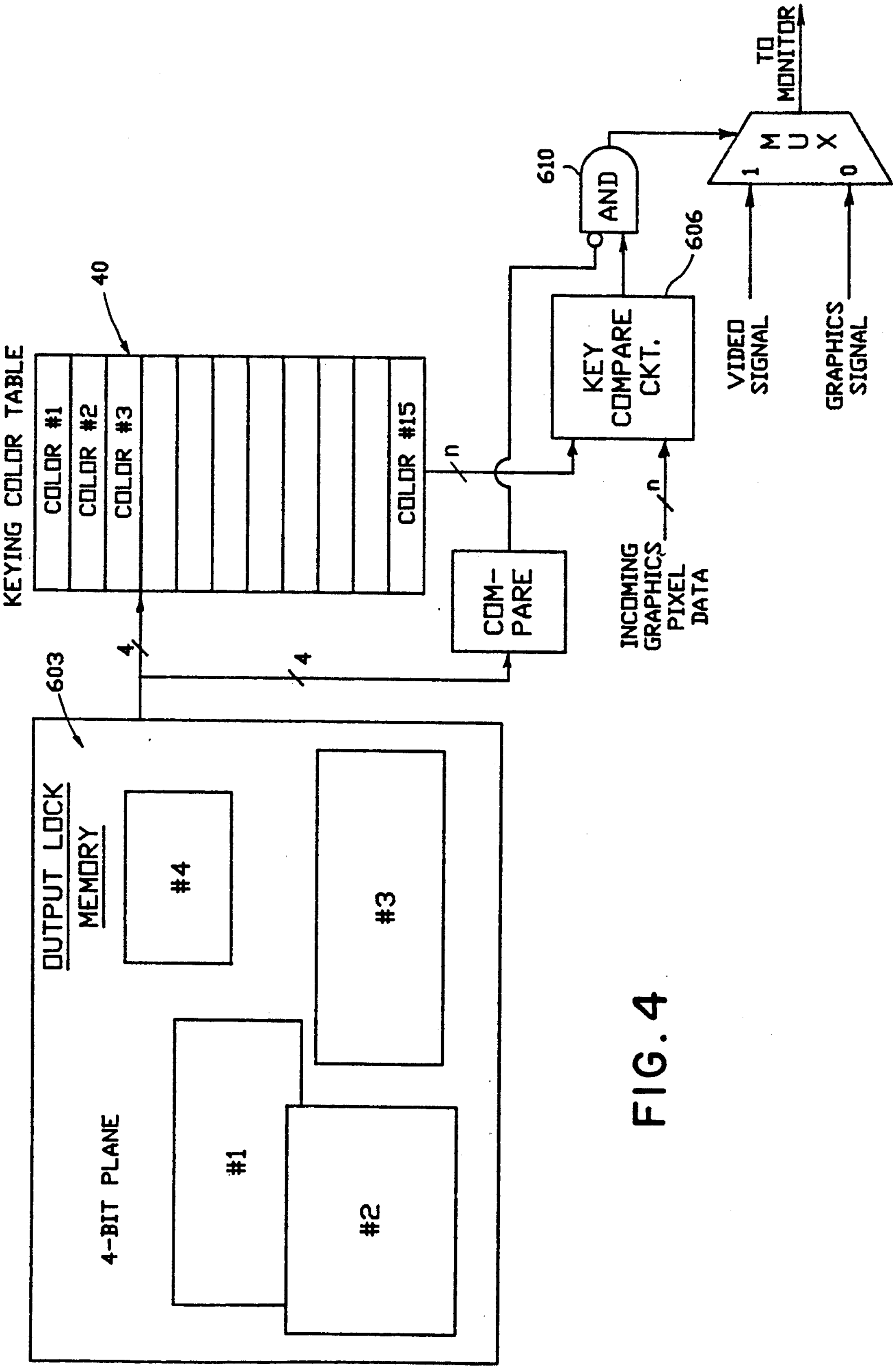
FIG. 4 comprises a functional block diagram illustrating how a more complex "color key" mechanism may be incorporated in the present invention for automatically allowing up to 15 different graphics windows to be automatically displayed on the monitor screen based on a table driven "color key" architecture, while at the same time retaining the attributes of the present output lock mechanism.

An extension of the present invention is shown in FIG. 4. If multiple bits are used in the Output Lock memory, a more flexible overlay scheme can be implemented, wherein each of several active video windows can have a dedicated overlay color independent of the overlay colors used by the other windows. Here, the Output Lock memory would have, for example, four-bit entries, with each entry specifying a "window number" from 1 to 15. When a video window is opened, it is assigned a window number and the region in the Output Lock memory corresponding to the video window is filled with this number. The number "0" is interpreted as before, i.e., no video overlay allowed. If it is desired to support more than 15 active windows, more bits must be used in the Output Lock memory.

Figure 2:
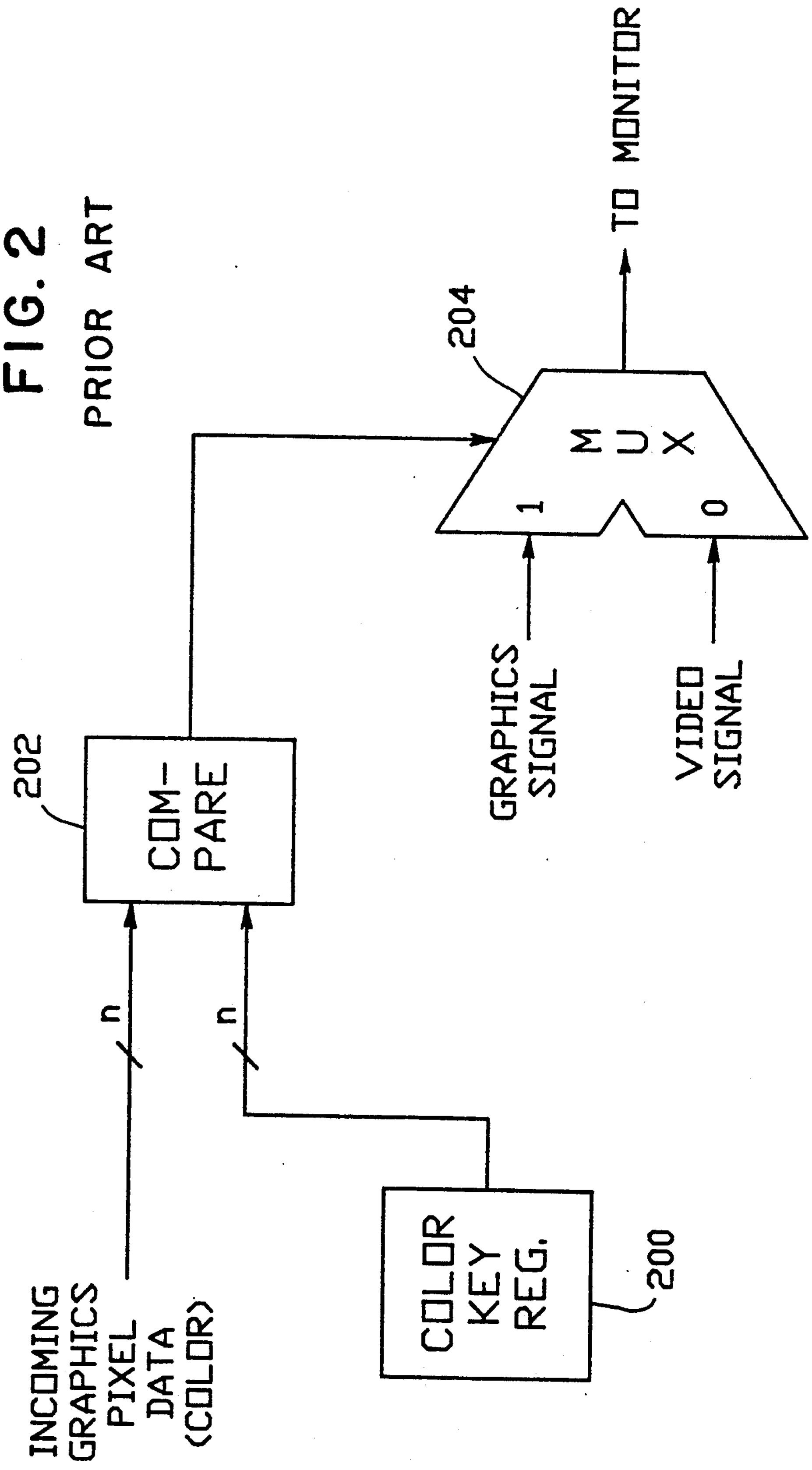
FIG. 2 PRIOR ART
FIG. 2 comprises a functional diagram of a typical prior art "color key" circuit by which graphics data having a particular color is automatically displayed in predetermined windows based on the background color of the graphics data.
Figure 3:
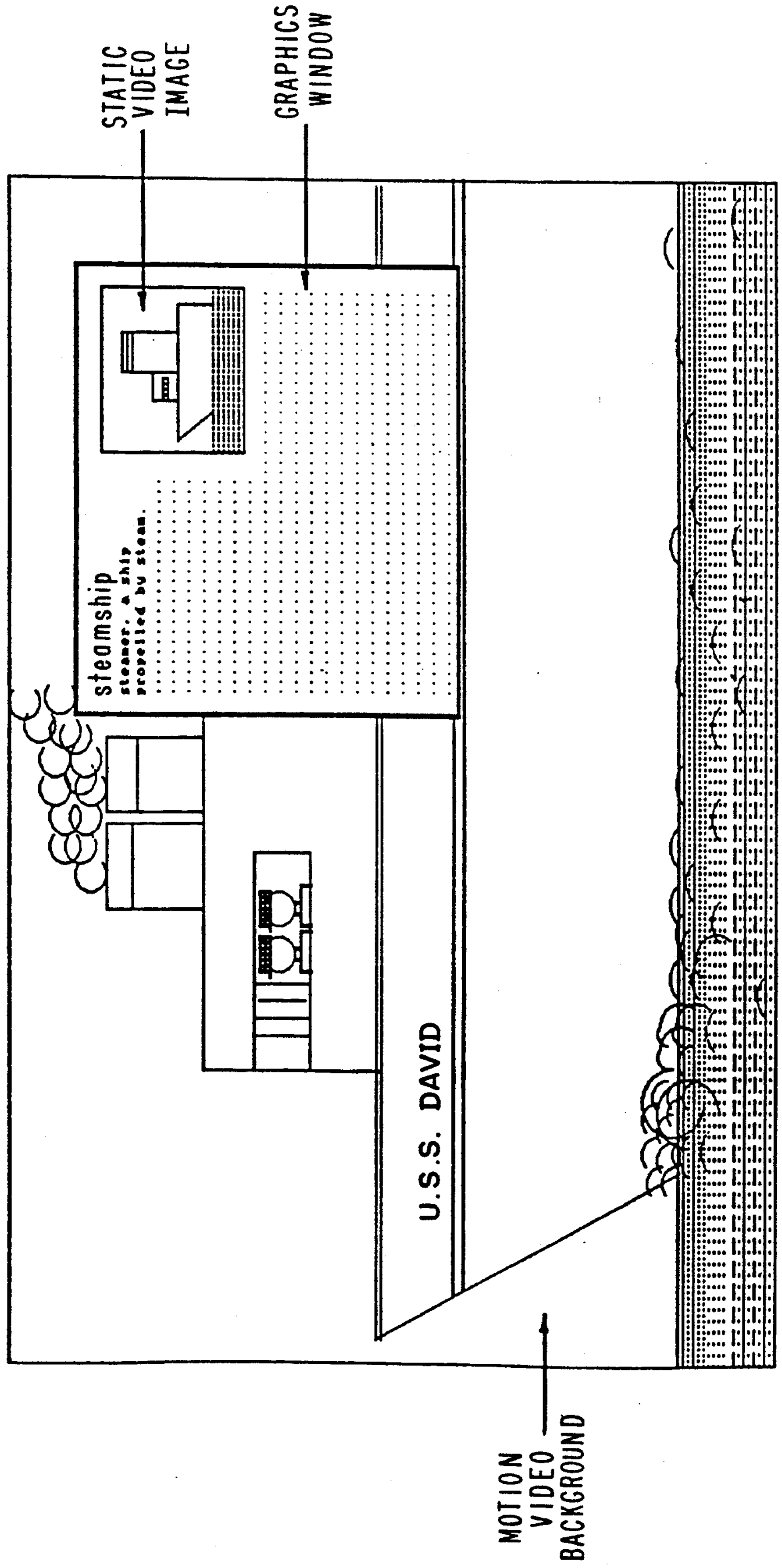
FIG. 3 comprises an illustration of a monitor display similar to FIGS. 1A and 1B, illustrating a further type of "window" presentation illustrating the function performed by the input lock mechanism of the present invention.

Referring briefly to FIG. 4, as video pixels are being read out from the video buffer, the corresponding 4-bit locations of the multi-bit Output Lock memory 603 (included in the video buffer) are also read out. The 4-bit number is used to address a 15-element "keying color" table 40. The keying color thus addressed is then used in the color keying operation as described earlier with reference to FIG. 2. The keying color used is hence dependent on the window number currently being displayed on the graphics screen. Each active window (up to 15 in all) therefore can define its own keying color, without regard for the keying colors used by other application windows currently on the screen. The output lock is activated to force graphics data, only when OL=0000. Otherwise when OL≠0 the color key is active and graphics data will be displayed only when there is a match. For a detailed explanation of the operation of the Output Lock, reference should be made to the subsequent description of FIG. 6. The reference numbers in FIG. 4 correspond to those in FIG. 6 for convenience of reference.

Figure 5B:
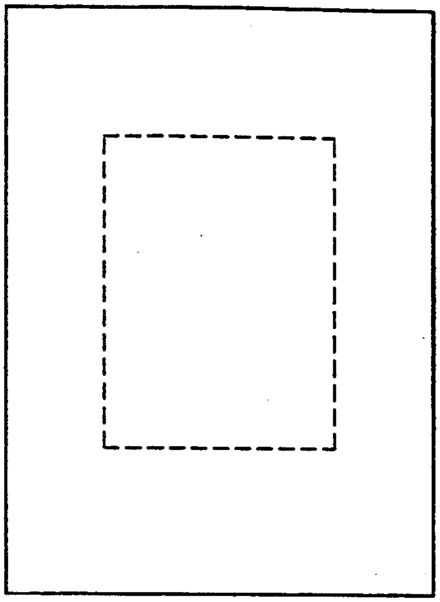
FIGS. 5A–5D are illustrative drawings similar to FIGS. 1A, 1B and FIG. 3, illustrating the types of multi-windowed mixed displays controlled by the output lock mechanism of the present invention.
Figure 5D:
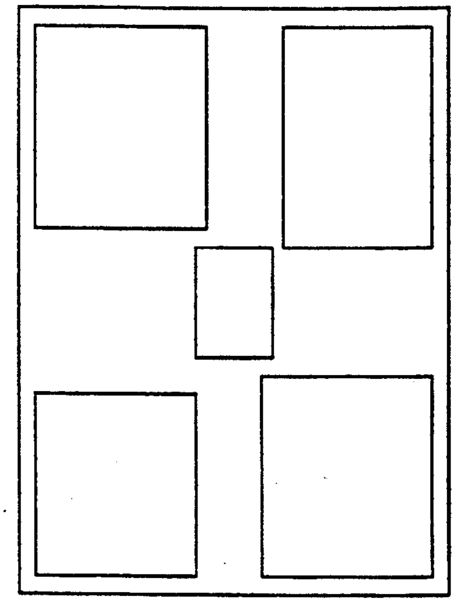
Figure 5A:
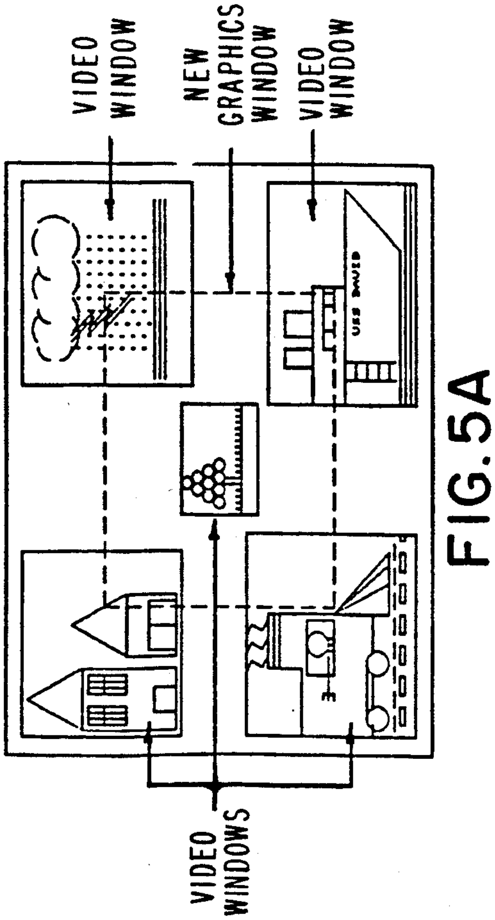
Figure 5C:
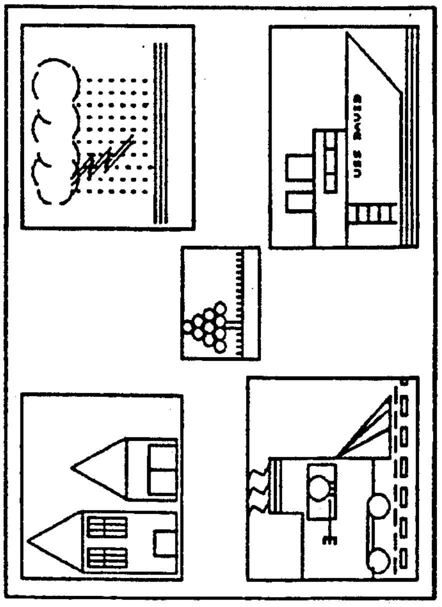

There is some overhead involved in the process of updating the output lock memory 603 each time a graphics window is opened or closed. The window manager must typically update each location in the Output Lock memory that is affected by the update. This problem becomes more serious as more and more windows become active on the screen. Consider the case where there are 5 video-based windows on the screen and a sixth graphics-only application is opened that has a large window (shown within the dotted lines) overlapping the other five windows, as in FIG. 5A. The region (shown in FIG. 5B) in the Output Lock memory corresponding to the large graphics window must be reset by the window manager in order to prevent video overlay in that region. This requires one large-area data move in software initializing a large area to all 0's (area=window). Now, consider that this graphics window is closed, producing a screen like that shown in FIG. 5C. The previously overlapped video windows are now uncovered, and the video overlay operation must be re-enabled in each uncovered region. Here, the window manager must update the regions shown in FIG. 5D, reinitializing all five regions separately. The performance of the system may be compromised by these update operations.

The performance degradation described can be minimized if some form of hardware assistance is provided to allow the window manager to quickly update the appropriate sections of the screen. The present invention provides such assistance with minimal additional hardware expense by using the same address control circuitry that is used to address video data regions of the video buffer during video sampling. By using this address control hardware to address the output lock memory instead of the video buffer, rectangular regions of this memory can be loaded very rapidly (at video rates). In the actual OL accessing (writing) operation the video-containing bits of each pixel would be blocked out (protected) by any well known means (write per bit) allowing only the desired OL bit(s) in each pixel to be written. It will be appreciated by those skilled in the art that any windowing mechanism or method resident in the computer may be used to generate the window coordinates which establish the Input Lock and Output Lock data patterns of "1"s and "0"s. One such method is shown in previously referenced copending patent application Ser. No.: 314623.

Accordingly details of the operation of the lock data generating mechanism is not shown as the details form no part of the present invention.

Input Lock

The Input Lock mechanism provides an effective means for protecting specific static video regions through the use of a special Input Lock memory. This is a one-bit memory having the same height and width as the video buffer, where the bits stored selectively control whether or not corresponding pixels in the video buffer get updated by the video sampling process. Where there are zeroes in this memory, corresponding locations in the video buffer may be updated by the incoming live video; where there are ones, the corresponding locations in the video buffer are prevented from being overwritten.

As was the case with the Output Lock memory outlined above, there is some software overhead involved in maintaining the Input Lock memory, as various static and moving video regions are manipulated on the screen. Again, hardware assistance can be provided by efficient use of the video sampling address control hardware. Using this hardware to address the Input Lock memory allows rectangular regions to be set and reset very quickly (at video rates).

Before proceeding with a description of the embodiment, it should be noted, in general that the synchronization of incoming motion (or still) video data with the high-resolution graphics output from a host computer is normally done by using the unique dual-port properties of VRAM technology. The secondary (serial) port of these special-purpose VRAMs can be operated completely asynchronously to the primary (random) port. Hence, the primary port can be used to store incoming video information synchronously, as it comes in, while the secondary port can read the video data out of the frame buffer synchronously with the high-resolution graphics display. Thus, time base correction can be achieved by appropriate use of the independent I/O properties of the video RAM's two ports. The present invention assumes the use of appropriately synchronized frame buffers, one for graphics data and one for video data. The synchronization of the data out parts is, of course, necessary for "windowing" operations as well as being required for properly driving the high-resolution monitor.

It should also be clearly understood that the circuitry and controls of the present invention as set forth and described herein are intended to function in cooperation with and require no significant modification of the Philips digital T.V. chip circuit family including a 12 bit. The frame buffer is of conventional design utilizing standard off the shelf video RAMS. All of the RAS, CAS, data ports (in and out) address ports and registers etc.. operate as in a standard frame buffer design comprised of such standard video RAMS chips. The Input Lock and Output Lock of the present invention would be connected to the conventional frame buffer architecture as disclosed herein.

As will be described subsequently, the input lock mechanism performs an external modification to the column address strobe pulses. The output lock mechanism in the simplest (1 bit) embodiment disclosed herein, utilizes an extra bit plane already existing in the frame buffer. The extra bit in this plane must of course be accessed for read/write ops, however, this circuit capability is also present.

Accordingly, details of the operation and construction of the frame buffer and its support circuitry are not shown as they form no part of the present invention and the inclusion of such detail would obfuscate same.

The following sections describe in detail how the Input Lock and Output Lock functions are implemented in the preferred embodiment of the invention. In this embodiment, the graphics information is provided by the Video Graphics Array (VGA) display controller 602 (FIG. 6) that is integrated with IBM's PS/2 line of personal computers. See for example IBM PS/2 Model 80, Technical Reference #68X2256 available from the IBM Corp. Mechanicsburg, Pa. It has a resolution of 640 pixels per scanline by 480 scanlines. Each pixel has eight bits of data describing its color. The video buffer 600 (FIG. 6) has the same height and width as the graphics buffer. It should be clearly understood that these specific dimensions or parameters are not in any way critical to the invention and that other resolutions are readily implemented (to suit other graphics displays, for example) without departing from the spirit and scope of the invention. In the following pages the first section will describe the implementation and operation of the Output Lock circuitry, and the second will describe the same aspects of the Input Lock circuitry.

Figure 6:
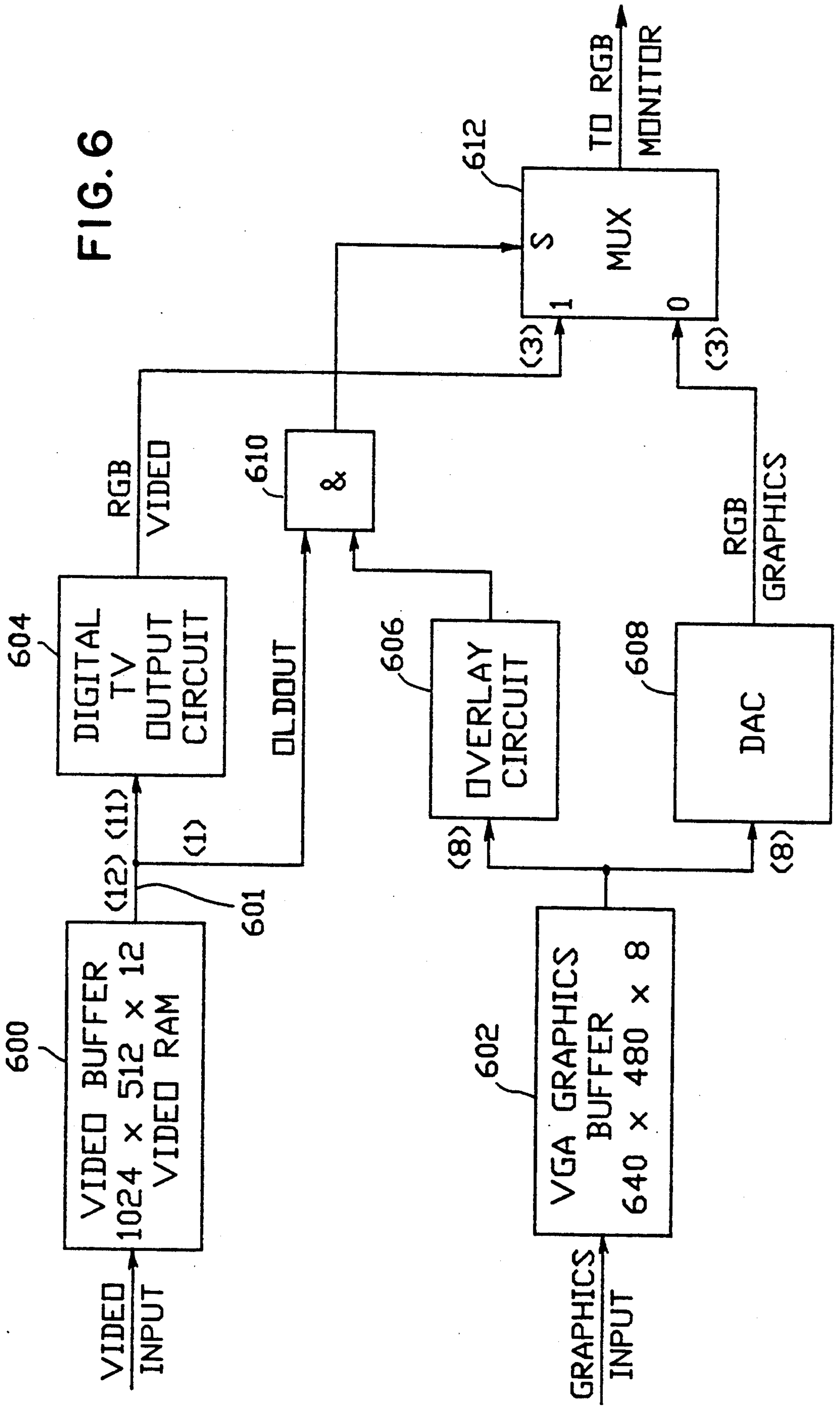
FIG. 6 comprises a high level of functional block diagram illustrating the overall architecture of the preferred embodiment of the output lock mechanism of the present invention.

The structure of the Output Lock circuitry is illustrated in FIG. 6.

There are 2 buffers in the basic system. The video buffer 600 is comprised of 6 1-Megabit Video RAMs (e.g., Toshiba TC524256) organized to yield a 1,024 by 512 by 12-bit structure. Eleven of the twelve bits are used to store motion video as it comes in from a video source (not shown). The remaining bit is the Output Lock bit described below. Note that only a 640×480 region of this buffer is actually used to store video; the remainder is unused, off-screen memory. This video information is read out of the second serial port 601 found on all Video RAM devices, and converted to RGB form via a Digital TV Output Circuit 604, such as that found in the Philips digital TV chip set. (See for example the manual entitled "Digital Video Signal Processing" Philips Components, #9398 063 30011)

For detailed information on the structure and operation of the VGA Graphics Buffer 602, refer to the IBM Personal System/2 Technical References, such as manual number 68X2256. The 8-bit pixels from the Graphics Buffer go to the Overlay Circuit 606 to generate the overlay signal, and to the Palette/DAC chip 608 (Inmos IMS-G171 in this disclosed embodiment). The Palette/DAC 608 converts the 8-bit pixels to RGB form.

The RGB MUX 612 is a 3-channel 2 to 1 Multiplexer that switches between the RGB signals from the Video Buffer 600 and those from the Graphics Buffer 602 on a pixel-by-pixel basis, as determined by the select input which is driven by the AND gate 610. When the select input is a logic 1, video information is sent to the RGB monitor. When it is a 0, graphics information is displayed. The Output Lock mechanism is implemented by making use of the 12th bit of the Video Buffer 600 as an Output Lock bit, known as Output Lock Data Out (OLDOUT). As each 11-bit video pixel is read out of the video buffer, the corresponding Output Lock bit is read out as well. This bit will affect the operation of the overlay circuit described earlier. When the bit is a one, overlay operations take place as normal. However, if the Output Lock bit is zero, the AND gate 610 will be forced to 0, forcing graphics data to be selected by the RGB Multiplexer 612, regardless of the overlay signal.

Output Lock Flash Write

As mentioned above, it is important to improve the performance of writing data to the Output Lock memory 603. By cleverly sharing the function of the video address generation hardware, it is possible to set and clear rectangular portions of the Output Lock memory at the same speed as video is sampled (one location every 70 nsec). This performance is adequate for most common windowing environments. This function requires a hardware mechanism that allows the system to address a rectangular array in the frame buffer in approximately 1/30 of a second. A mechanism for doing this is disclosed in detail in previously referenced copending U.S. patent application #314623.

Figure 7:
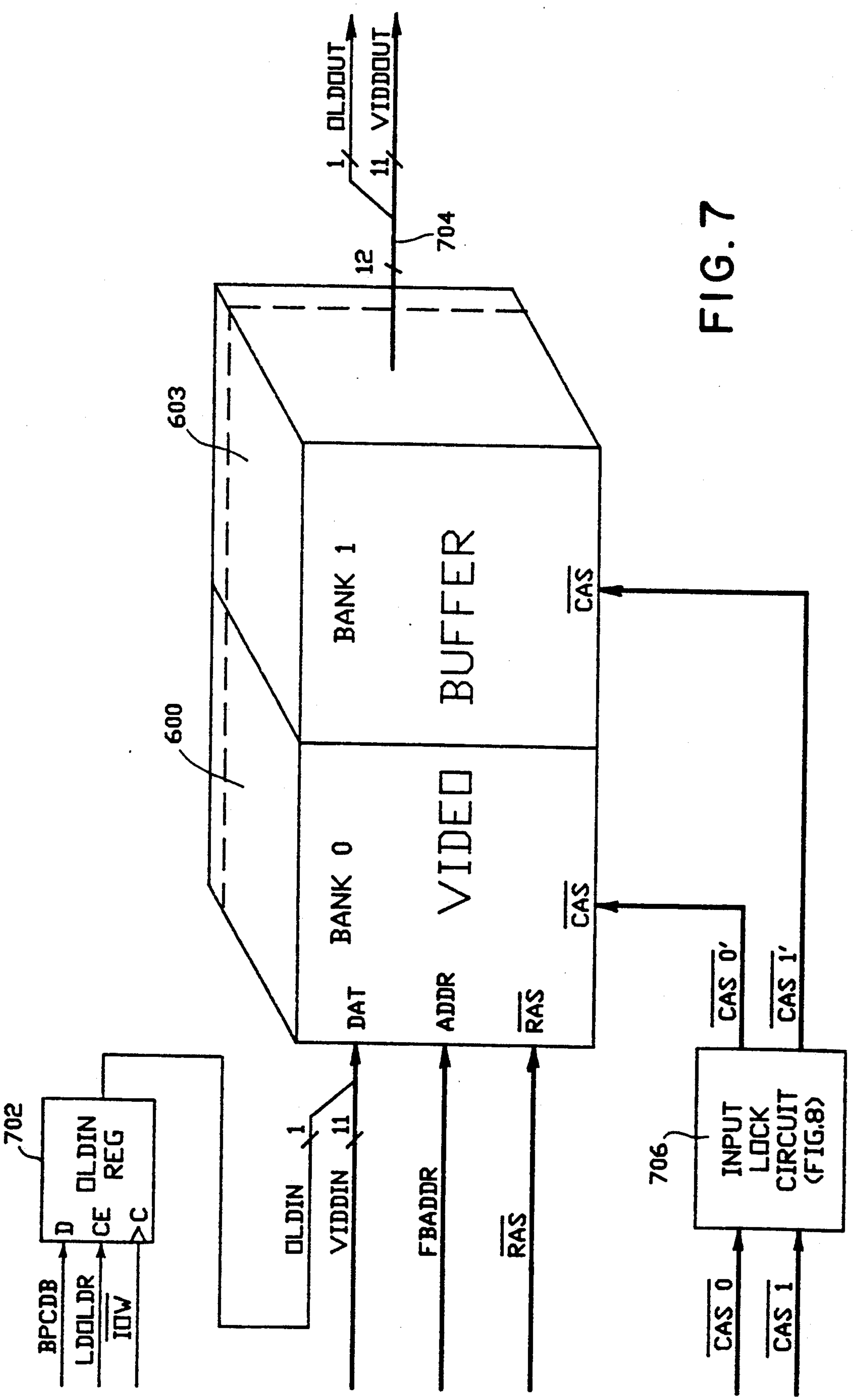
FIG. 7 is a diagrammatic illustration of the video buffer memory organization showing the various drive lines connected thereto and further illustrating the location of the input lock mechanism of the present invention and its control of the column address strobes (CAS) as well as clearly indicating that the output lock data is read as a single bit from the output port of the buffer memory separate from the video data.

A simplified block diagram of the video buffer memory organization can be seen in FIG. 7.

Before proceeding with a description of this figure, reference should be made to the following table in which various abbreviations used in the figure are defined.

| | |
|---|---|
| BPCDB - | Buffered PC Data Bus |
| LDOLDR - | Load Output Lock Data Register |
| IOW - | I/O Write Strobe |
| CAS∅ - | Column Address Strobe (Block ∅) |
| CAS 1 - | Column Address Strobe (Block 1) |
| CAS $0^1$ - | CAS ∅' Modified CAS ∅ |
| CAS $1^1$ - | CAS 1'Modified CAS 1' Modified CAS 1 |
| OLDIN - | Output Lock Data Input |
| VIDDIN - | Video Data Input |
| FBADDR - | Frame Buffer Address |
| RAS - | Row Address Strobe |
| CAS - | Column Address Strobe |
| DAT - | Frame Buffer Data |
| ADDR - | Frame Buffer Address |

The buffer 600 is 12 bits deep, with 11 bits used for video (7 luminance, 4 chrominance), and 1 bit for Output Lock information. This simple list plane of Output lock memory is designated in the figure by the reference numeral 603. Hence, the same addressing circuitry used for rapid (real-time) sampling of video into the frame buffer can be used to quickly load rectangular regions in this "12th bit" or Output Lock memory 603.

The Output Lock Data Input (OLDIN) register 702 is wired directly to the 12th data bit of the frame buffer 600, while the other 11 bits are connected to the 11-bit video data input bus (VIDDIN). To quickly load a rectangular region in the Output Lock memory 603, the sample addressing circuitry is first set up to access the desired region and a 0 or 1 is written to the OLDIN register 702 via the host computer data bus BPCDB, write control signal IOW-, and register address decode LD OLDR. A normal "video sampling" operation is allowed to take place for one frame, after which all locations within the desired region in the Output Lock memory 603 will have been set or reset, depending on the contents of the register.

At the video buffer serial output port 704 the 11 bit video data output VIDDOUT and 1 bit Output Lock Data Output OLDOUT are shown. They are used as shown in FIG. 6.

In order to access this bit as though it were a separate memory, a means must be provided whereby only the 12th bit or only the first 11 bits are modified. During normal video sampling operations, the 11 video bits must be constantly updated by the incoming video information, while the 12th (Output Lock) bit must be preserved. However, when the Output Lock memory 603 is modified, only the 12th bit should be updated, leaving the 11 video bits intact.

This can be accomplished through the use of the "write-per-bit" capability found on most commercially available video RAM chips. By the proper use of the control signals to these RAM chips, it is possible to mask out individual bits during an access, preventing them from being modified, while the other bits get updated normally. Hence, when video sampling operations take place, the write-per-bit function will mask the 12th bit of the frame buffer 600, preserving the Output Lock information. Conversely, when the output lock memory 603 is accessed, write-per-bit is used to allow only the 12th bit to be modified, preserving the 11 bits of video information.

Input Lock

Figure 8A:
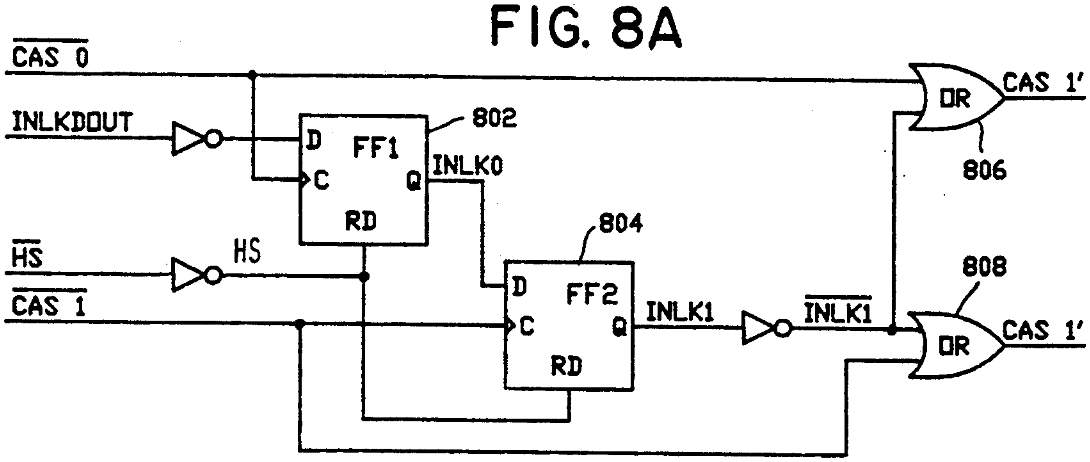
FIGS. 8A, 8B and 8C comprise functional schematic diagrams of the input lock circuitry shown in FIG. 7 which produce the controlling column address strobe pulses $\overline{CAS\ 0'}$ and $\overline{CAS\ 1'}$.
Figure 9:
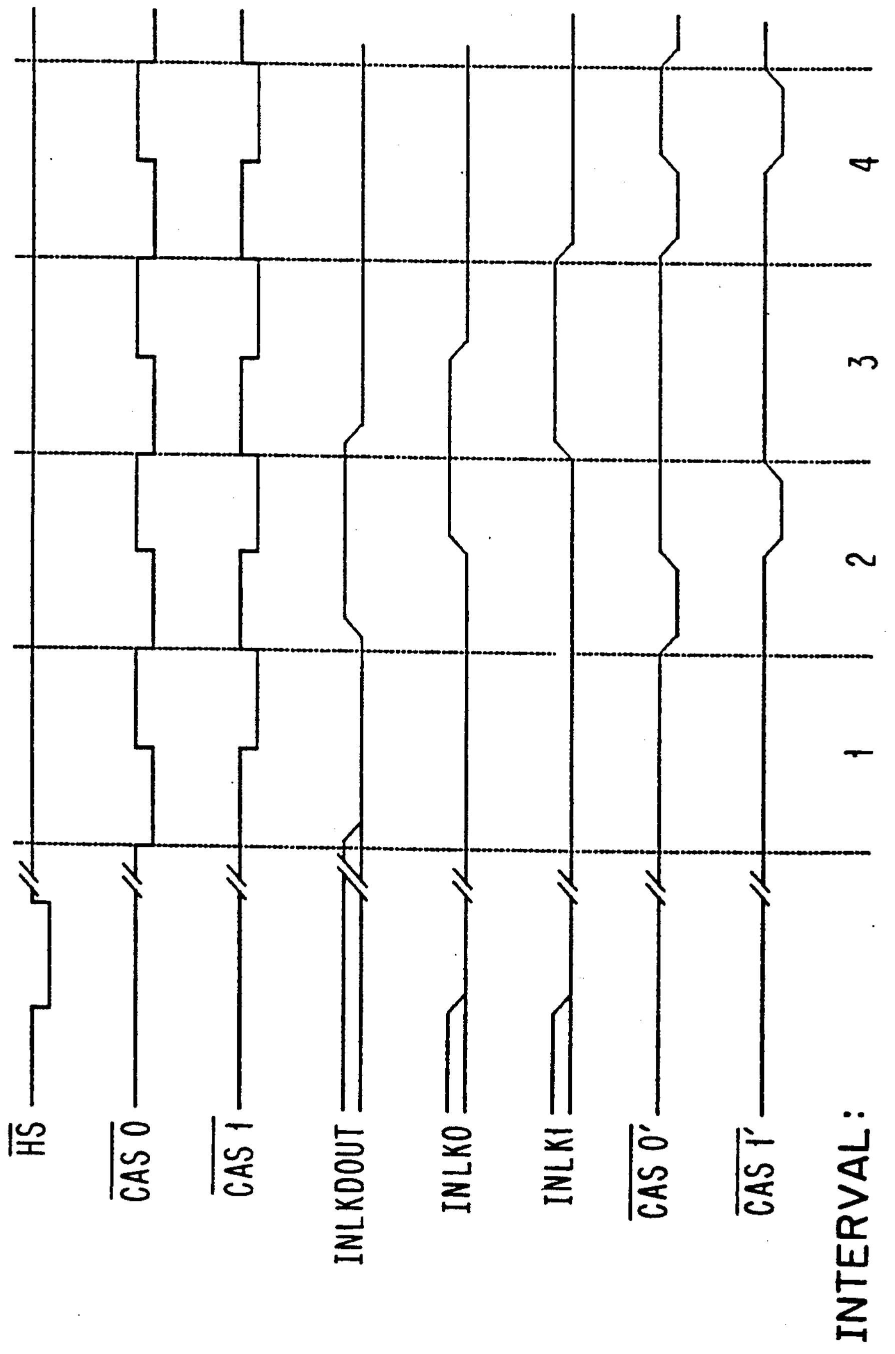
FIG. 9 comprises a series of characteristic signal wave forms produced by the system during operation of the input lock mechanism of the present invention as shown in FIGS. 7 and 8.

The Input Lock circuit 706 in FIG. 7 is shown in detail FIGS. 8A, B and C with a timing diagram therefor in FIG. 9.

Figure 8B:
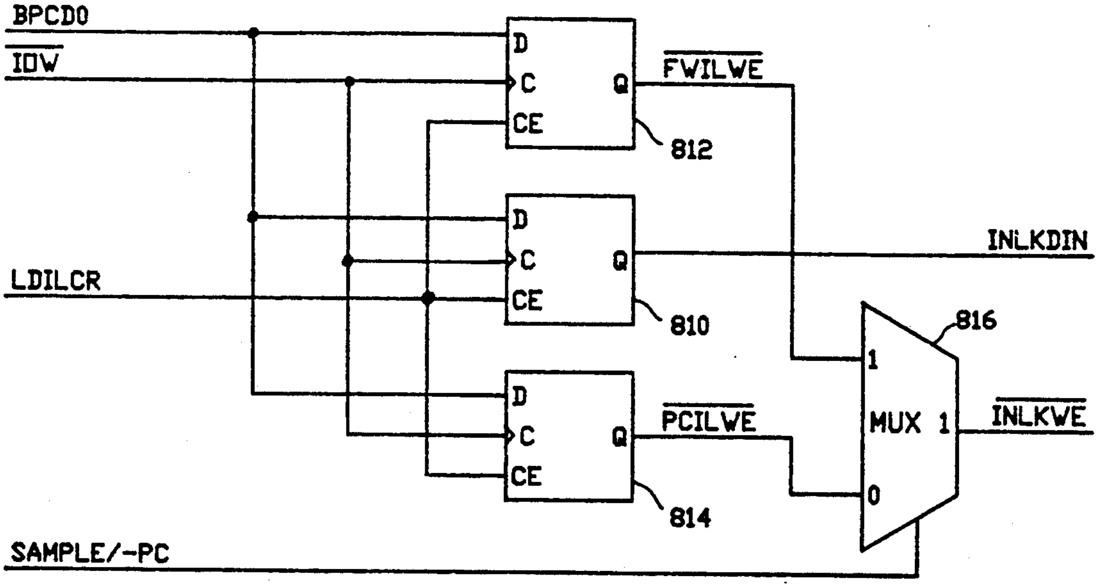
Figure 8C:
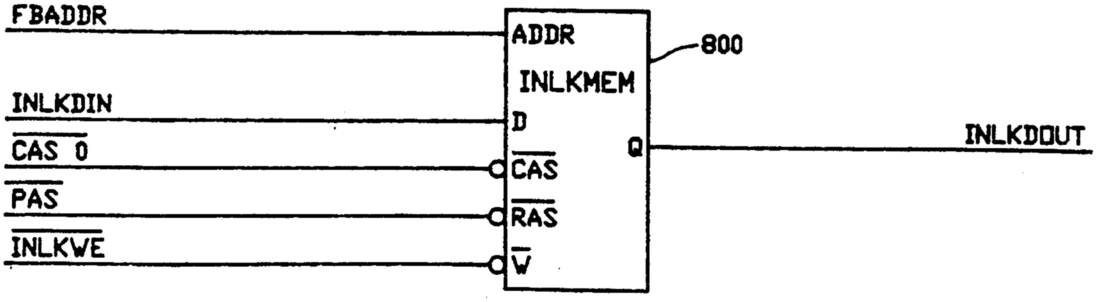

Before proceeding with a description of FIG. 8, reference should be made to the following table in which various abbreviations used in the figure are defined.

| | |
|---|---|
| CAS 0 - | Column Address Strobe ∅ |
| INLK D OUT - | Input Lock Data Out |
| HS - | Horizontal Sync |
| CAS 1 - | Column Address Strobe 1 |
| BPCDB - | Buffered PC Data Bus |
| IOW - | I/O Write Strobe |
| LDILCR - | Load Input Lock Control Register |
| SAMPLE/PC - | Sample Video/Load from PC |
| FB ADDR - | Frame Buffer Address |
| INLKDIN - | Input-Lock Data Input |
| RAS - | Row Address Strobe |
| INLKWE - | Input Lock Write Enable |
| D - | D: Flip-Flop Data Input |
| C - | C: Flip-Flop Clock Input |
| RD - | RD: Flip-Flop Reset Direct Input |
| CE - | CE: Flip-Flop Clock Enable Input |
| W - | W: RAM Write Enable |
| FWILWE - | Flash Write Input Lock Write Enable |
| PCILWE - | PC Input Lock Write Enable |
| INLKD OUT - | Input Lock Data Output |
| INLKI ∅ - | Input Lock Flip-Flop ∅ output |
| INLK 1 - | Input Lock Flip-Flop 1 output |

It consists of a 256K×1 dynamic RAM 800 (e.g., T.I. TMS4256), and associated control logic. There are 3 basic sections in the circuit. The bottom portion 8C is the Input Lock memory itself (INLKMEM). The middle portion FIG. 8B is used when loading the Input Lock memory, and the upper portion FIG. 8A is used when the memory is accessed, i.e., during video sampling operations.

The address to the dynamic RAM 800 is the same address as the one applied to the frame buffer 600 (FBADDR) in FIG. 7. Since the same address is used, the content of the Input Lock memory can be thought of as another "layer" behind the frame buffer pixels, mapping each pixel. This is conceptionally the same as for the OL memory plane. Therefore, as will be appreciated by those skilled in the art, the same hardware that is used to address rectangular regions of the video buffer, 600 is used to address rectangular regions in the Input Lock Memory 800. Since the DRAM is 512×512 (256K), each location affects 2 consecutive samples in the 1024×512 frame buffer array 600, one in Bank 0 controlled by CAS 0 and one in Bank 1 controlled by CAS 1.

Referring to FIG. 7, the signals CAS 0' - and CAS 1' - are separate CAS- signals to each of two banks (0 and 1) of the video buffer 700. Two banks are required in order to realize a 1K wide memory using memory chips which are organized as 512×512. These two signals are produced by the Input Lock circuit 706 in response to the CAS- timing pulses CAS 0- and CAS 1- which are in turn produced by a generic memory controller. When the CAS pulses are passed through the Input Lock circuit and appropriately modified (or not), normal memory cycles take place. When they are blocked through the action of the Input Lock memory, the memory cycles will be prevented or inhibited.

FIGS. 8 A–C illustrate the implementation of the Input Lock controls. To load the Input Lock memory, a static value (0 or 1) is placed in the Input Lock Data Input Register 810 (INLKDIN) (input D of the INLKMEM 800) by the host computer via the host computer data bus BPCDB, write control signal IOW-, and address decode LDILCR. This value will be written into a rectangular region of the input lock memory 800. As addressed by the current sampling operation, when the Flash Write Input Lock Write Enable register 812 (FWILWE) is reset to 0. Once the desired region is loaded, INLKFWE is set to 1, and normal operation will resume, with the new Input Lock memory contents preserved.

The Input Lock memory 800 can also be loaded directly by the host computer by resetting the PC Input Lock Write Enable (PCILWE) register 814. In this case, an arbitrarily shaped region in the Input Lock memory 800 can be loaded, as the host computer drives FBADDR directly. When the host computer accesses the video buffer 600 in this way, the mode signal Sample/PC- will be low, selecting PCILWE- to drive the final Input Lock Write Enable signal INLKWE- (via multiplexer 816).

Typically, the Input Lock memory 800 would first be cleared (set INLKDIN to 0 and set up the sample addressing to address the full memory) and then a small region would be set (set INLKDIN to 1 and set up sample addressing to address the desired sub-region).

In operation, Input Lock Data Output bits (INLKDOUT) are read out of the Input Lock memory 800 one at a time, as video sampling takes place. The INLKDOUT data is then used by the circuit in FIG. 8A to modify the CAS- signals before they are applied to the video buffer 600.

The INLKDOUT data is passed through 2 flip-flops 802 and 804, clocked by CAS0- and CAS1- respectively. The output of the second flip-flop 804 is then used to determine whether the next two pixels will be protected or not. This protection is done by OR'ing the 2nd flip-flop with the CAS timing pulses CAS0- and CAS1- in OR circuits 806 and 808 before they go to the frame buffer. If the 2nd flip-flop 804 (INLK1) is 0, then the next two samples will not be written into the frame buffer 700, since the CAS timing pulses CAS0- and CAS1- will not get through the final OR gates, and without a CAS pulse, data cannot be written. If the 2nd flip-flop (INLK1) is 1, then the next two samples will be written. Horizontal Sync (HS-, active low) is inverted to produce signal HS, which in turn is used to clear both flip-flops 802 and 804 at the beginning of each scan line using their Reset Direct (RD) inputs.

FIG. 9 is an example illustrating the timing of this circuit. In this example, the sequence of bits from the Input Lock memory 800 is assumed to be 0,1,0, . . . so that the 1st and 3rd sample will be written, and the 2nd will be protected. This sequence will be repeated for each scan line, with Input Lock memory 800 determining the particular pattern of 1's and 0's each time. At the beginning of a scan line, Horizontal Sync (HS-) will go active low, resetting INLK0 and ILNK1 once. Sometime later, in interval 1, the first 0 is read out from the Input Lock memory 800 on INLKDOUT. Halfway through that interval, this 0 is clocked into the first flip-flop 802 (INLK0). At the beginning of interval 2, this 0 is clocked into the second flip-flop 804 (INLK1). Since INLK1 is 1, the CAS0- and CAS1- pulses are allowed through OR gates 806 and 808 to produce pulses CAS0 -' and CAS1-', thus writing data into the frame buffer 600. Also in interval 2, the next data is read out on INLKDOUT, which is now a 1. This gets clocked through flip-flops 802 and 804 in the second half of interval 2 and the beginning of interval 3 respectively. At this point, INLK1 is low, which prevents CAS0- and CAS1- from getting through OR gates 806 and 808 so CAS0-' and CAS1-' stay high (inactive). Therefore, no data is written. Again, the next data comes out on INLKDOUT in the same interval (3). This time, it is another 0, so that in interval 4, CAS0- and CAS1- are allowed to pass through on CAS0-' and CAS1-' and data is written.

CONCLUSIONS

The system herein described has many of its functional characteristics generalized to accommodate future improvements in mixed digital television/personal computer graphics display technologies without departing from the spirit and scope of the invention. In this embodiment, the digital television subsystem is based on a chip set manufactured by Philips as stated previously. The host system is illustrated as an IBM Personal System/2 with MCA, which includes a VGA graphics (640×480×4 bit pixel) subsystem. The high-resolution video system described need not be limited to the bandwidth and bits/pixel provided by the VGA. Future digital TV and graphics technologies can readily be incorporated without departing from the spirit of this invention.

It is accordingly not intended to limit the present invention to the specific embodiments described above. It is recognized that many changes may be made in the circuits and processes specifically described herein without departing from the scope and teaching of the present invention, and it is intended to encompass all other embodiments, alternatives, and modifications consistent with the invention as set forth in the appended claims.

We claim:

1. In a high-resolution video display system including a high-resolution monitor, a computer for providing control signals to said display system, a high-resolution graphics frame buffer for storing computer generated graphics images and supplying said graphics data images to the monitor at a rate controlled by said computer generated control signals, and a video data system including a video frame buffer for supplying video data to the monitor under control of said computer the improvement which comprises, an output locking mechanism functionally located between the output of both said frame buffers and the high-resolution monitor including combinatorial and switching circuit means for allowing graphics data to overwrite video data 1) under control of a bit pattern stored in an output lock memory having a bit set to a predetermined state for every pixel of graphics data to be displayed or 2) under control of a color key circuit including means for comparing a predetermined color key field associated with each graphics data pixel with a color key provided by the computer and causing the video data to be displayed on the monitor when there is a match, and an input locking mechanism including means for selecting one of two lock modes the first mode for preventing static video data stored in predetermined regions of the video frame buffer as defined by an input lock pattern from being overwritten by motion TV data being continually input to said video frame buffer and the second mode for preventing data written into said video frame buffer by the computer from being overwritten by such motion TV data, said input lock mechanism means including input lock memory means for storing a pattern of those bit locations in the video frame buffer which are protected and means for automatically causing the input lock memory to be loaded concurrently with the writing of data into said video frame buffer by a single command from the computer.

2. A high-resolution video display system as set forth in claim 1 wherein said output lock memory comprises at least one reserved bit-plane in the video frame buffer which stored a predetermined output lock pattern and further including means for utilizing the serial output port of the video frame buffer operating under control of the video frame buffer addressing circuitry operating in the monitor display mode for accessing the output lock bit field of the video frame buffer in parallel with the video data bit field, said combinatorial and switching circuit means including means for determining if the bit pattern in the output lock memory represents an "output lock" and if so disabling the output of the video frame buffer and enabling the output of the graphics frame buffer on the data path to the monitor, and means for loading a predetermined lock pattern into said output lock memory including, means utilizing the addressing and memory accessing controls of the video frame buffer for sequentially entering predetermined patterns of ones and zeroes provided by a host computer at addresses provided by said host computer and means for inhibiting the writing of any data into pixel data storage locations of said memory while said output lock data is being stored therein.

3. A high-resolution video display system as set forth in claim 1, wherein said input lock memory comprises a dynamic random access memory (DRAM) having as many bit storage locations as there are pixels in the video frame buffer for storing input lock pattern data and means for utilizing said input lock pattern data in conjunction with normal write operations in the video frame buffer to control the addressing and accessing circuitry of the video frame buffer to disable the accessing function in predetermined regions thereof, and means for accessing by a host computer for loading said DRAM with an input lock data pattern indicative of the region on the monitor on which moving video data is not to be displayed, said means for loading comprising utilizing the addressing circuitry of the video frame buffer to concurrently address predetermined regions of said DRAM to store said input lock data patterns in said predetermined regions thereof.

4. A high-resolution video display system as set forth in claim 2 wherein said output lock memory further includes a plurality of reserved bit planes in the video frame buffer wherein a predetermined bit pattern represents said output lock function and other bit patterns represent "color key", enabling means operable when there is no output lock active for utilizing said color key to control graphics data display and means for utilizing said color key for enabling the display of selected video data rather than graphics data at those pixel locations for which the color of the graphics data matches the "color key".

5. A high-resolution video display system as set forth in claim 4 wherein said means utilizing said "color key " includes a comparator circuit for continuously comparing the color signal accompanying graphics pixel data with a predetermined color key, a successful compare enabling a "video output" of a multiplexer circuit means which selectively functions to pass graphics data or video data whereby said video data will be displayed on the monitor screen when said multiplexer is so enabled, said means utilizing said "color key" bit patterns stored in the reserved bit planes of said output lock memory further including means for utilizing said color key bit pattern to access a color key table where an expanded color key is stored, and further means operable under control of said output lock pattern to enable the graphics output of said multiplexer irrespective of the output of said "color key" comparator circuitry.

6. In a high-resolution video display system including a high-resolution monitor, a computer for providing control signals to said display system, a high-resolution graphics frame buffer for storing computer generated graphics images and supplying said graphics data images to the monitor at a rate controlled by said computer generated control signals, and a video data system including a video frame buffer for supplying video data to the monitor under control of said computer the improvement which comprises, an output locking mechanism functionally located between the output of both said frame buffers and the high-resolution monitor including means for allowing graphics data to overwrite video data 1) under control of a bit pattern stored in an output lock memory having a bit set to a predetermined state for every pixel of graphics data to be displayed or 2) under control of a color key circuit including means for comparing a predetermined color key field associated with each graphics data pixel with a color key provided by the computer and causing the video data to be displayed on the monitor when there is a match;

said output lock memory comprising a plurality of reserved bit-planes in the video frame buffer wherein a predetermined bit pattern represents said output lock function and other bit patterns represent color keys;

means utilizing the serial output port of the video frame buffer operating under control of the video frame buffer addressing circuitry operating in the monitor display mode for accessing the output lock bit field of the video frame buffer in parallel with the video data bit field, a combinatorial and switching circuit means including means for determining if the bit pattern in the output lock memory represents an "output lock" and if so disabling the output of the video frame buffer and enabling the output of the graphics frame buffer on the data path to the monitor, and enabling means operable when there is no output lock active for utilizing said bit pattern for accessing a color key to control graphics data display and means utilizing said color key for enabling the display of selected video data rather than graphics data at those pixel locations for which the color of the graphics data matches the "color key".

* * * * *